United States Patent [19]
Tran

[11] Patent Number: 5,909,587
[45] Date of Patent: Jun. 1, 1999

[54] MULTI-CHIP SUPERSCALAR MICROPROCESSOR MODULE

[75] Inventor: Thang M. Tran, Austin, Tex.

[73] Assignee: Advanced Micro Devices, Inc., Sunnyvale, Calif.

[21] Appl. No.: 08/957,085

[22] Filed: Oct. 24, 1997

[51] Int. Cl.⁶ .................................................. G06F 15/00
[52] U.S. Cl. ................................ 395/800.01; 395/800.23
[58] Field of Search ......................... 395/800.01, 800.02, 395/800.1, 800.23, 800.24, 800.25, 800.32, 800.35, 800.38

[56] References Cited

U.S. PATENT DOCUMENTS

| | | | |
|---|---|---|---|
| 5,432,913 | 7/1995 | Smits et al. | 395/652 |
| 5,553,144 | 9/1996 | Almquist et al. | 380/25 |
| 5,581,767 | 12/1996 | Katsuki et al. | 395/800.11 |
| 5,742,844 | 4/1998 | Feldman | 395/800.32 |
| 5,764,946 | 6/1998 | Tran et al. | 395/586 |
| 5,832,294 | 11/1998 | Reinschmidt | 395/800.32 |
| 5,834,940 | 11/1998 | Savkar et al. | 395/392 |

OTHER PUBLICATIONS

Harvatis et al., "Pin Assignment for High–Performance MCM Systems", IEEE International Symposium on Circuits and Systems, May 12–15, 1996, vol. 4, pp. 771–774.

M. Cases, "Performance Comparison of Single and Multiple–Chip Packages in a Personal Computer Application", Electrical Performance in Electronic Packaging, Oct. 20–22, 1993, pp. 9–11, IEEE.

Dehkordi et al., "Early Cost/Performance Cache Analysis of a Split MCM–Based MicroSparc CPU", Proceeding of the Multi–Chip Module Conference, Feb. 6–7, 1996, pp. 148–153, IEEE.

Lomax et al., "Area I/O Flip–Chip Packaging to Minimize Interconnect Length", Proceedings of the Multichip Module Conference, Feb. 4–5, 1997, pp. 2–7, IEEE.

Garg et al., "Incorporating Multi–Chip Module Packaging Constraints into System Design", Proceedings of the European Design and Test Conference, Mar. 11–14, 1996, pp. 508–513, IEEE.

Banerjia et al., "Issues in Partitioning Integrated Circuits for MCM–D/Flip–Chip Technology", Proceedings of the Multichip Module Conference, Feb. 6–7, 1996, pp. 154–159, IEEE.

*Primary Examiner*—William M. Treat
*Attorney, Agent, or Firm*—Conley, Rose & Tayon, PC; B. Noel Kivlin

[57] ABSTRACT

The pipeline of a microprocessor is partitioned near its mid point such that a first portion of the functionality of the microprocessor is implemented on a first integrated circuit chip and a second portion of the microprocessor functionality is implemented on a second integrated circuit chip. In one implementation, the first integrated circuit chip includes an instruction cache, an instruction alignment unit, and a plurality of decode units for implementing fetch, alignment and decode stages, respectively, of the processor pipeline. Instructions are selected from the instruction cache by the instruction alignment unit and are provided to a respective decode unit. A compression unit may compress the information output by the decode units to prepare conveyance of the information from the first integrated chip to the second integrated circuit chip. The second integrated circuit chip contains circuitry to implement execute and write-back stages of the processor pipeline. This circuitry may include a plurality of execution units coupled to receive output signals from the decoders of the first integrated circuit chip, corresponding reservation stations, a load/store unit and a data cache. A decompression unit may be coupled to receive the compressed information from the compression unit of the first integrated circuit chip to decompress the information prior to providing it to the reservation stations and/or execution units.

18 Claims, 3 Drawing Sheets

MULTI-CHIP SUPERSCALAR MICROPROCESSOR MODULE

BACKGROUND OF THE INVENTION

1. Field of the Invention

This invention relates to the field of microprocessors and, more particularly, to pipeline partitioning techniques employed within microprocessors and to multi-chip microprocessor modules.

2. Description of the Relevant Art

Microprocessors are a key component in computer systems. Generally, the microprocessor is the master in a computer system, controlling other components according to a sequence of instructions provided by a user. The sequence of instructions is referred to as a program. Because the microprocessor is the master, many times the performance of the computer system is characterized by the performance of the microprocessor. As a result, microprocessor manufacturers have made dedicated efforts to increase the performance of their microprocessors.

One common performance improvement technique implemented in both scalar and superscalar microprocessors is "pipelining". Pipelining involves dividing a complex function that needs to be performed upon an object into a collection of sequential, independent tasks. Each of the independent tasks can then be assigned to a location where that task would be performed upon any object moved to that location. A "pipeline" is defined as the collection of locations and the tasks performed at those locations. A "pipeline stage" can then be defined as a location within the pipeline. By implementing the independent tasks in separate locations, the complex function may be performed on multiple objects simultaneously. No single performance of the complex function occurs more quickly, but the aggregate amount of time necessary to perform the task on multiple objects decreases.

Objects enter a pipeline and flow through the pipeline stages. When an object is moved out of a pipeline stage, another object may move into that pipeline stage. In order for a pipeline to function, it is necessary that objects move from pipeline stage to pipeline stage simultaneously, so that at no time is a given pipeline stage expected to retain a previous object and accept a new object. Additionally, no object is permitted to leave a pipeline stage until that pipeline stage has completed performing its task on the object. The two above mentioned requirements lead to the assignment of a fixed time interval to a pipeline. As each time interval expires, the objects within the pipeline move to the next pipeline stage. Therefore, the time interval for a particular pipeline is required to be at least as large as the largest amount of time required to execute a given independent task. In a microprocessor, the time interval is defined by a clock signal which opens and closes registers that define the pipeline stages and other storage locations within the processor. A "register" is a storage device that is directed by a clock to accept new values at regular intervals. A certain type of register known as a single phase register opens when the clock signal makes a transition, and closes a short time later. During the time that the register is "open", it accepts a new value. During the time that the register is "closed" it retains the value that it accepted when it was last opened. Accepting a new value into a register is referred to as "sampling" a value. The time interval in a microprocessor is referred to as a "clock cycle".

The simultaneous movement of objects between pipeline stages is referred to as "advancing" the pipeline. Sometimes, a pipeline is defined having situations where the pipeline cannot advance in some time intervals. Such a situation may exist, for example, when two pipeline stages share a resource that is occasionally used by one stage or the other. In cases where the resource is needed by both pipeline stages, then one stage will use the resource in a time interval, the pipeline is not advanced at the end of the time interval, and then the other stage uses the resource. At the end of the second time interval, the pipeline advances. Not advancing the pipeline at the end of a time interval is referred to as "stalling" the pipeline. Pipeline stages are connected in the order that the associated tasks are performed. A pipeline stage that receives an object before that object passes to a second pipeline stage is said to be "upstream" of that second pipeline stage. A pipeline stage that receives an object after a second pipeline stage has received the object is said to be "downstream" from that second pipeline stage.

A problem occurs when pipeline stages cannot be assigned independent tasks that require similar time intervals. The time interval must be set equal to or greater than the largest amount of time required to perform any of the independent tasks implemented in the pipeline. Therefore, the stages requiring less than the time interval to complete their task idle for the remainder of the time interval. In some cases, the set of pipeline tasks actually requires more time to execute than the complex function would require if implemented in a single step. Among the reasons why the complex function can be faster than the pipelined implementation of the complex function are that idle times exist for stages that complete their tasks in less time than the allotted time interval, and that a finite amount of time is required to advance the pipeline. Therefore, each added stage increases the amount of time required to complete the complex task on a single object. In some cases, a task associated with a pipeline stage can be further divided into tasks that can be implemented in separate stages. Such a division is desirable in cases where the task to be divided is the task that determines the necessary time interval, and the remaining tasks in the pipeline require significantly less time to complete. In other cases, however, a task cannot be naturally divided.

A particularly important application of pipelining in microprocessors is the processing of instructions. In order to process an instruction, a complex set of functions must be performed: the instruction must be retrieved from memory ("fetching"); the operations required by the instruction must be determined ("decoding"); the instruction must be transferred to an execution unit ("dispatching"); the operations required by the instruction must be performed ("executing"); and the results of the operations must be recorded ("writeback"). If these functions are performed separately in a non-pipelined fashion for each instruction in a program, the time required to process all the instructions in the program would be large. However, if the tasks are divided into stages in which each stage requires a similar amount of time to perform its assigned task, then the processing of instructions may overlap each other.

Another important consideration with respect to the design of a microprocessor relates to the size of the semiconductor die upon which the microprocessor is fabricated. With every generation of typical microprocessor families, the die size and number of transistors has increased tremendously. The increased number of transistors is required to implement the ever-increasing functionality supported by the typical microprocessor, as well as to implement the integration of other subsystems which are closely coupled to the microprocessor.

Unfortunately, increases in die sizes can result in difficulties in fabrication and in lower yields in manufacturing. To mitigate these problems, one approach has accordingly involved separating the functionality of a microprocessor system into smaller chips for incorporation within a multi-chip module. Specifically, in this approach a secondary cache is implemented on a chip separate from the main processor, and smaller primary caches (i.e., small data and instruction caches) are incorporated on the main processor chip upon which the decode and execution circuitry are also fabricated. By separating the functionality in this manner, a relatively large secondary cache is made possible, thereby enhancing performance.

Since in the above-described partitioning scheme the smaller primary caches are incorporated on the same die as the main processor circuitry (including the decode and execute circuitry), the overall sizes of these caches must be kept relatively small to allow for a reasonable overall die size. Similarly, the capabilities and functionality associated with the other processor circuitry on the main processor die must also be limited to keep the die within a reasonable size. Thus, while significant enhancements to the overall performance of a processor could be obtained by providing enhancements to the circuitry associated with the main processor die, in many instances such enhancements are not exploited due to die size limitations. In addition, although the size of the die containing the secondary L2 cache could be increased since the die space needed to implement the L2 cache itself is typically somewhat smaller than the practical limitations associated with a maximum die size, such additional die space can typically not be used to implement functionality of the main processor chip due the large number of required interconnections which would be required between the chips.

SUMMARY OF THE INVENTION

The problems outlined above are in large part solved by a superscalar microprocessor implemented in a multi-chip module in accordance with the present invention. In one embodiment, a superscalar microprocessor is provided which executes instructions from a variable byte-length instruction set. The pipeline of the microprocessor is partitioned near its mid point such that a first portion of the functionality of the microprocessor is implemented on a first integrated circuit chip and a second portion of the microprocessor functionality is implemented on a second integrated circuit chip. In one implementation, the first integrated circuit chip includes an instruction cache, an instruction alignment unit, and a plurality of decode units for implementing fetch, alignment and decode stages, respectively, of the processor pipeline. Instructions are selected from the instruction cache by the instruction alignment unit and are provided to a respective decode unit. A compression unit may compress the information output by the decode units to prepare conveyance of the information from the first integrated chip to the second integrated circuit chip.

The second integrated circuit chip contains circuitry to implement execute and write-back stages of the processor pipeline. This circuitry may include a plurality of execution units coupled to receive output signals from the decoders of the first integrated circuit chip, corresponding reservation stations, a load/store unit and a data cache. A decompression unit may be coupled to receive the compressed information from the compression unit of the first integrated circuit chip to decompress the information prior to providing it to the reservation stations and/or execution units.

By partitioning the microprocessor between the decode and execute stages of the processor pipeline, high yield in fabrication of the microprocessor may be achieved while allowing enhancements in various functionality such as branch prediction. The sizes of the semiconductor dies may be made approximately equal and be made up to a practical maximum size. Furthermore, the number of interconnects between the chips may be kept relatively low by partitioning the chips between the decode and execute stages, and by providing compression and decompression of information conveyed therebetween.

BRIEF DESCRIPTION OF THE DRAWINGS

Other objects and advantages of the invention will become apparent upon reading the following detailed description and upon reference to the accompanying drawings in which.

Figure 1:
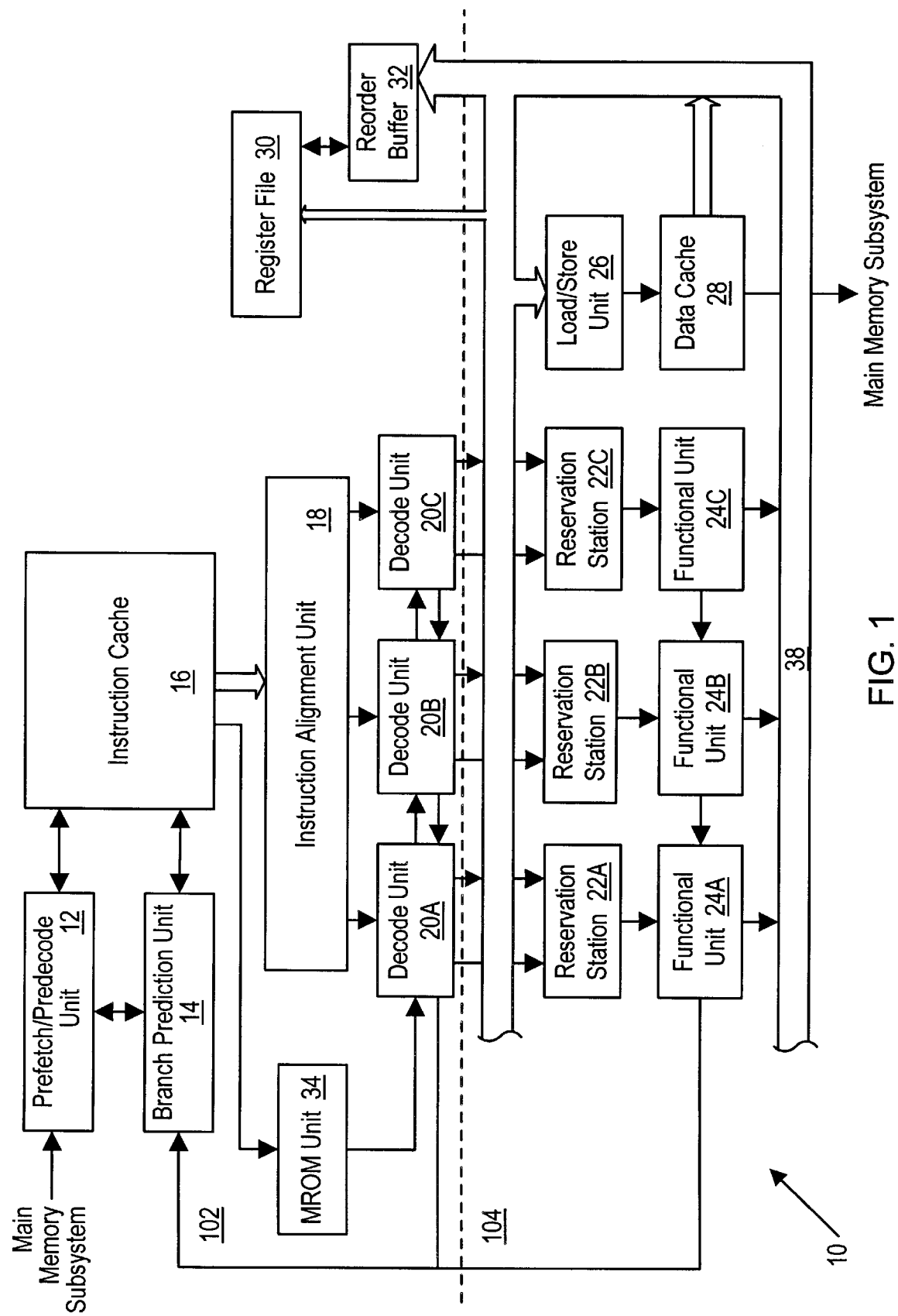
FIG. 1 is a functional block diagram of one embodiment of a microprocessor module.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor module 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Generally speaking, the illustrated functionality of microprocessor module 10 is implemented on a pair of integrated circuit dies 102 and 104 which are encapsulated within a common integrated circuit package forming the microprocessor module. In this implementation, the functionality of prefetch/predecode unit 12, branch prediction unit 14, instruction cache 16, instruction alignment unit 18, decode units 20, MROM unit 34, register file 30, and reorder buffer 32 are implemented on integrated circuit die 102. Reservation stations 22, functional units 24, load/store unit 26 and data cache 28 are implemented on a second integrated circuit die 104. A secondary cache, such as an L2 cache, which forms a portion of the main memory subsystem may further be fabricated upon integrated circuit die 104. Further details regarding the interface between integrated circuit dies 102 and 104 will be discussed further below in conjunction with FIGS. 3 and 4.

Figure 2:
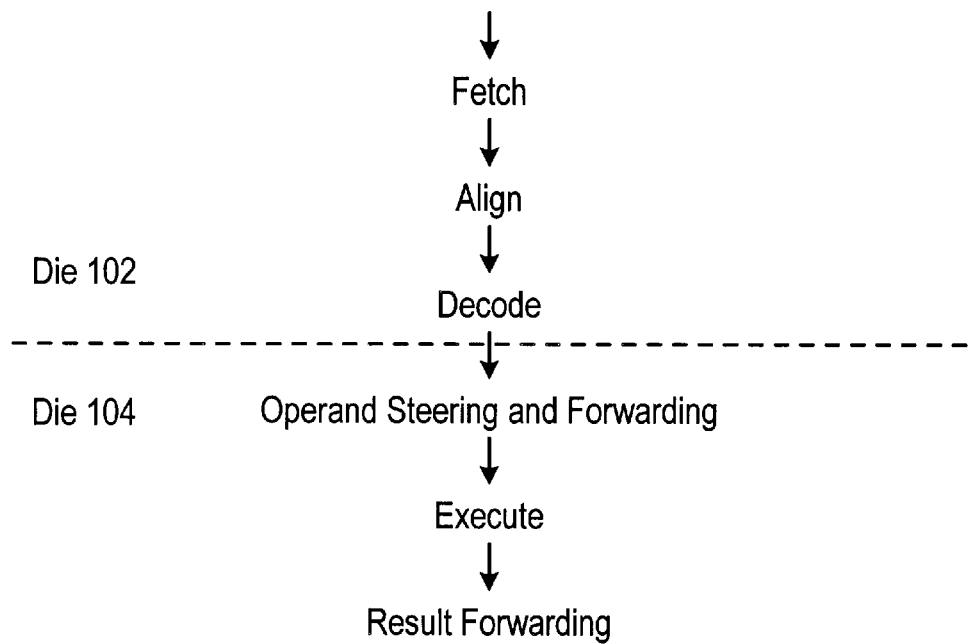
FIG. 2 is a pipeline diagram depicting generalized pipeline stages formed by the microprocessor of FIG. 1.

Aspects regarding the operation of microprocessor 10 will next be discussed. FIG. 2 is a pipeline diagram depicting generalized pipeline stages formed by microprocessor 10. Referring collectively to FIGS. 1 and 2, instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 4 way set associative structure having 32 byte lines (a byte comprises 8 binary bits). Alternatively, 2 way set associativity may be employed as well as any other desired associativity. Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions such as x86 instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. In one embodiment, as prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. It is noted that this information is conveyed from integrated circuit die 102 to integrated circuit die 104 via a set of interconnect wires, as discussed further below. In one embodiment, each reservation station 22 is capable of holding instruction information (i.e., instruction control values as well as operand values, operand tags and/or immediate data) for up to three pending instructions awaiting issue to the corresponding functional unit. Each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. This information is passed from integrated circuit die 104 to integrated circuit die 102. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. Information passed from functional units 24 to reorder buffer 32 is conveyed from integrated circuit die 104 to integrated circuit die 102. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

It is thus noted that from the above description and the generalized pipeline diagram of FIG. 2, various pipeline stages are implemented within microprocessor 10. A first pipeline stage comprises the fetching of instructions from instruction cache 16. The instructions are then aligned with respect to issue positions formed by decode units 20 during a second pipeline stage, and are decoded during a third pipeline stage. During a fourth pipeline stage, operand steering and forwarding occurs wherein operands, along with the decoded instructions, are provided to reservation stations 22. During the fifth depicted pipeline stage, the instructions are executed, and upon the last pipeline stage, the results of the execute units 24 are forwarded. It is understood that the functionality of various ones of the depicted pipeline stages of FIG. 2 may actually be broken into multiple separate pipeline stages. For example, instruction alignment may consist of several individual pipeline stages. Similarly, the depicted decode stage may be implemented across several individual pipeline stages.

Figure 3:
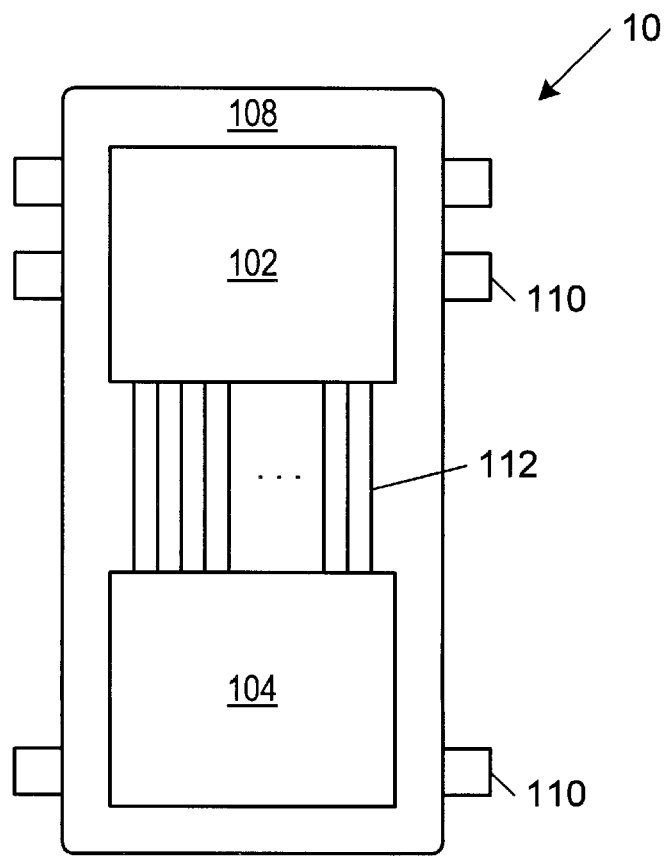
FIG. 3 is a diagram illustrating a microprocessor module including separate integrated circuit dies.

FIG. 3 is a diagram illustrating microprocessor 10 including the first integrated circuit die 102 and the second integrated circuit die 104. The integrated circuit dies 102 and 104 are situated within a common integrated circuit package 108 having a plurality of pins 110 to provide external connections to other computer system components. A plurality of interconnect wires 112 are provided to provide coupling between the integrated circuit dies.

As depicted in FIG. 2, the partitioning of integrated circuit dies 102 and 104 is such that the partition is made at the approximate midpoint of the processor pipeline. The number of interconnect wires 112 may advantageously be kept relatively low by providing functionality up to and including decoding on integrated circuit die 102, and conveying decoded instruction information to the other integrated circuit die 104 for execution of the instructions.

Figure 4:
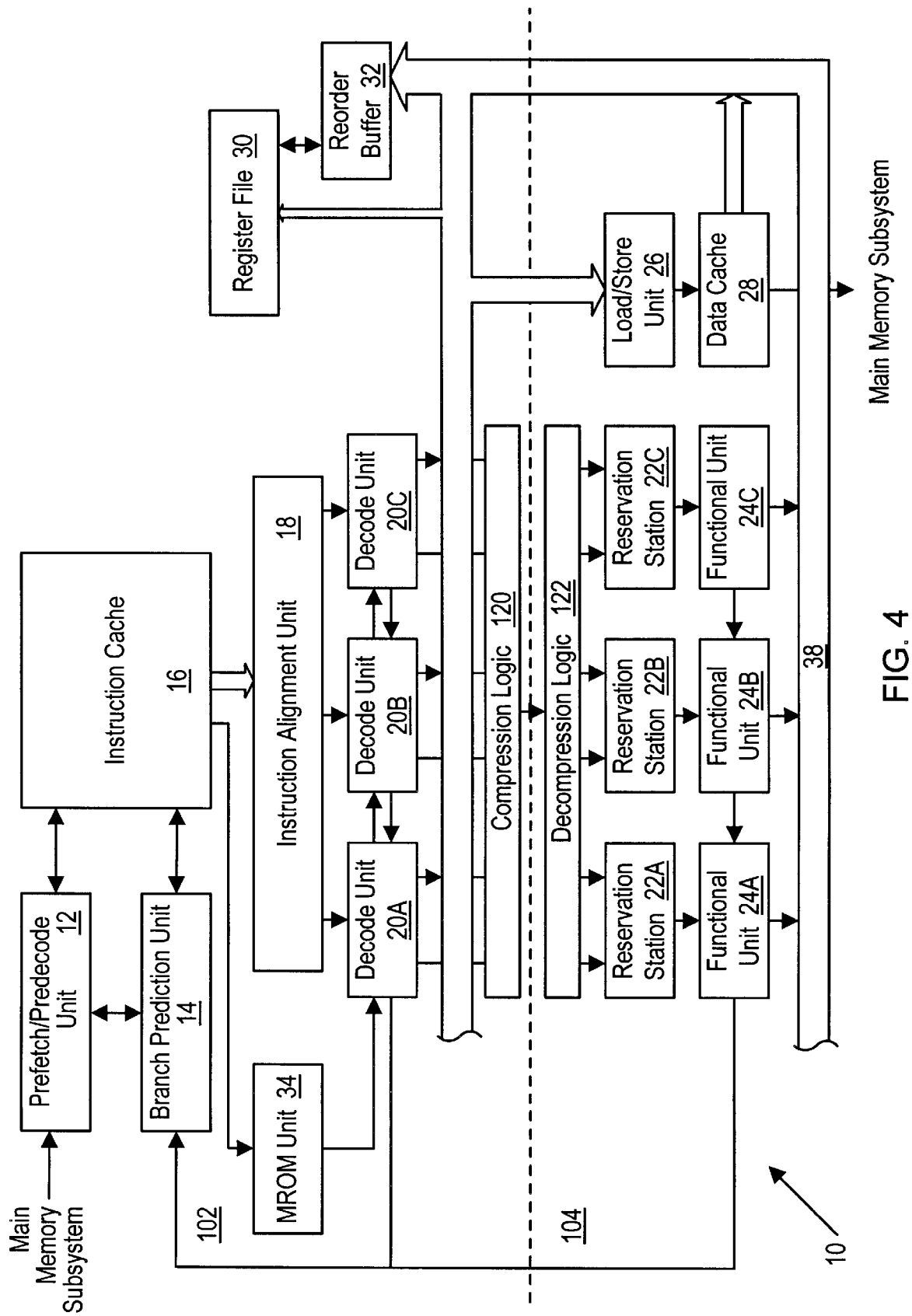
FIG. 4 is a functional block diagram illustrating further aspects associated with an embodiment of the microprocessor module.

FIG. 4 illustrates further details of an embodiment of microprocessor 10 including compression logic 120 and decompression logic 122. Circuit portions corresponding to those of FIG. 1 are numbered identically for simplicity and clarity. In the system of FIG. 4, the output of decode units 20 is compressed by compression logic 120 prior to conveyance of the decoded instruction information to integrated circuit die 104. A variety of compression techniques may be employed by compression logic 120. The compressed information conveyed by compression logic 120 is represented using fewer bits than the overall number of bits comprising the output of decode units 20.

Decompression logic 122 receives the compressed information and decompresses the information prior to its input to reservation stations 22. Compression logic 120 and decompression logic 122 advantageously reduce the number of required interconnects between integrated circuit die 102 and integrated circuit die 104. It is noted that additional information conveyed between the integrated circuit dies may further be compressed, as desired. It is further noted that additional pipeline stages may be introduced into the instruction pipeline to accommodate the compression and decompression functions.

Numerous variations and modifications will become apparent to those skilled in the art once the above disclosure is fully appreciated. It is intended that the following claims be interpreted to embrace all such variations and modifications.

What is claimed is:

1. A microprocessor module comprising:
    a first integrated circuit chip including an instruction cache configured to store instruction code and a decode unit configured to decode said instruction code; and
    a second integrated circuit chip separate from said first integrated circuit chip, wherein said second integrated circuit chip includes an execute unit coupled to receive decoded instructions from said decode unit and configured to execute said decoded instructions.

2. The microprocessor module as recited in claim 1 further comprising a common integrated circuit package within which said first integrated circuit chip and said second integrated circuit chip are encapsulated.

3. The microprocessor module as recited in claim 2 wherein said integrated circuit package includes a plurality of pins for providing external connections to said microprocessor module.

4. The microprocessor module as recited in claim 1 wherein said first integrated circuit chip further includes a branch prediction unit coupled to said instruction cache.

5. The microprocessor as recited in claim 4 wherein said first integrated circuit chip further includes a predecode unit coupled to said instruction cache.

6. The microprocessor module as recited in claim 1 wherein said second integrated circuit chip further includes a data cache coupled to said execute unit for storing data.

7. The microprocessor module as recited in claim 1 further comprising a load/store unit coupled to receive decoded load and store instructions from said decode unit.

8. The microprocessor module as recited in claim 1 wherein said first integrated circuit chip further includes a reorder buffer coupled to said decode unit.

9. The microprocessor module as recited in claim 1 wherein said first integrated circuit chip further includes a data compressor for compressing information from said decode unit to be provided to said second integrated circuit chip.

10. The microprocessor module as recited in claim 9 wherein said second integrated said circuit chip includes a decompression unit for decompressing said compressed information.

11. A microprocessor module comprising:
    a first integrated circuit chip including an instruction cache configured to store instruction code, a decode unit configured to decode said instruction code, and a compression unit configured to compress decoded instruction information received from said decode unit; and
    a second integrated circuit chip separate from said first integrated circuit chip, wherein said second integrated circuit chip includes a decompression unit configured to decompress compressed information received from said compression unit to thereby reconstruct said decoded instruction information, and an execute unit coupled to execute instructions corresponding to said decoded instruction information.

12. The microprocessor module as recited in claim 1 further comprising a common integrated circuit package within which said first integrated circuit chip and said second integrated circuit chip are encapsulated.

13. The microprocessor module as recited in claim 12 wherein said integrated circuit package includes a plurality of pins for providing external connections to said microprocessor module.

14. The microprocessor module as recited in claim 11 wherein said first integrated circuit chip further includes a branch prediction unit coupled to said instruction cache.

15. The microprocessor as recited in claim 14 wherein said first integrated circuit chip further includes a predecode unit coupled to said instruction cache.

16. The microprocessor module as recited in claim 11 wherein said second integrated circuit chip further includes a data cache coupled to said execute unit for storing data.

17. The microprocessor module as recited in claim 11 further comprising a load/store unit coupled to receive decoded load and store instructions from said decode unit.

18. The microprocessor module as recited in claim 11 wherein said first integrated circuit chip further includes a reorder buffer coupled to said decode unit.

* * * * *